(12) United States Patent
Cohen (10) Patent No.: US 7,676,646 B2
(45) Date of Patent: Mar. 9, 2010

(54) PACKET PROCESSOR WITH WIDE REGISTER SET ARCHITECTURE

(75) Inventor: Earl T. Cohen, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 11 days.

(21) Appl. No.: 11/071,660

(22) Filed: Mar. 2, 2005

(65) Prior Publication Data

US 2006/0200647 A1 Sep. 7, 2006

(51) Int. Cl.
*G06F 15/00* (2006.01)
(52) U.S. Cl. .......................................... 712/1; 712/225
(58) Field of Classification Search .................. 712/2, 712/1, 225
See application file for complete search history.

(56) References Cited

U.S. PATENT DOCUMENTS

| 5,928,356 | A | 7/1999 | Golliver | |
|---|---|---|---|---|
| 7,240,164 | B2 * | 7/2007 | Hooper et al. | 711/143 |
| 2003/0005103 | A1 | 1/2003 | Narad | |
| 2003/0143415 | A1 | 7/2003 | Naik | |
| 2003/0159016 | A1 * | 8/2003 | Barlow et al. | 712/4 |
| 2003/0204636 | A1 | 10/2003 | Greenblat | |
| 2006/0143415 | A1 * | 6/2006 | Naik | 711/163 |

FOREIGN PATENT DOCUMENTS

GB 2382676 6/2003

WO WO 2005096142 10/2005

OTHER PUBLICATIONS

"IBM PowerNP network processor: Hardware, software, and applications"; Allen, Jr., et al.; Mar. 2003.*
"Register Packing: Exploiting Narrow-Width Operands for Reducing Register File Pressure"; Ergin et al.; 2004; IEEE.*
Krishnamurthy et al.; "Architecture and Hardware for Scheduling Gigabit Packet Streams"; 2002; IEEE.*
European Patent Office; European Search Report; EP application No. 06735074.4; Feb. 4, 2009; 7 Pages.

* cited by examiner

*Primary Examiner*—Alford W Kindred
*Assistant Examiner*—Benjamin P Geib
(74) *Attorney, Agent, or Firm*—Stolowitz Ford Cowger LLP (57) ABSTRACT

A Wide Register Set (WRS) is used in a packet processor to increase performance for certain packet processing operations. The registers in the WRS have wider bit lengths than the main registers used for primary packet processing operations. A wide logic unit is configured to conduct logic operations on the wide register set and in one implementation includes hardware primitives specifically configured for packet scheduling operations. A special interlocking mechanism is additionally used to coordinate accesses among multiple processors or threads to the same wide register address locations.

The WRS produces a scheduling engine that is much cheaper than previous hardware solutions with higher performance than previous software solutions. The WRS provides a small, compact, flexible, and scalable scheduling sub-system and can tolerate long memory latencies by using cheaper memory while sharing memory with other uses. The result is a new packet processing architecture that has a wide range of cost/performance points, based on desired scheduling requirements.

21 Claims, 5 Drawing Sheets

PACKET PROCESSOR WITH WIDE REGISTER SET ARCHITECTURE

BACKGROUND

Packet processors are used in routers, switches, servers, Personal Computers (PCs), etc. for processing and routing packets in a packet switched network, such as the Internet. The packet processor is often required to schedule both the processing of received packets and the outputting of packets after packet processing is completed. The type and amount of packet traffic received and transmitted by the packet processor constantly varies. Thus, these scheduling operations are important for fairly and efficiently processing the packets.

There is a problem efficiently implementing packet scheduling in packet processors. Hardware-based approaches can operate very fast, but tend to be inflexible and costly. For example, a whole Application Specific Integrated Circuit (ASIC) may be required for packet scheduling operations.

The desire to have a flexible solution, for example, one whose algorithm/function can be changed without spinning an ASIC, strongly motivates a software based solution. However, software based solutions for scheduling operations run very slowly due to the number of required serial logic operations.

These extensive processing requirements are further complicated by the large data structures used for packet scheduling. In the case of some hardware implementations, these data structures can be over 1000 bits wide. Even with alternative scheduling structures (e.g., calendars), items such as the schedule state are still too wide for the registers typically used in the packet processor. Needless to say, the task of fetching, updating, and storing such large data structures can be costly on a Central Processing Unit (CPU) or even a Network Processing Unit (NPU).

The multiple fields used in the scheduling data structure also do not correspond well with the register files used in packet processors. For example, these different fields may not have bit lengths of 8, 16, or 32 bits. This forces the packet processor to perform many data alignment and masking operations just to prepare the scheduling data for subsequent processing.

What is missing is a processing architecture in the middle that provides a cheap and flexible solution that runs at speeds significantly faster than current software options, but whose cost is less than previous hardware approaches. The present invention addresses this and other problems associated with the prior art.

SUMMARY OF THE INVENTION

A Wide Register Set (WRS) is used in a packet processor to increase performance for certain packet processing operations. The registers in the WRS have wider bit lengths than the main registers used for primary packet processing operations. A wide logic unit is configured to conduct logic operations on the wide register set and in one implementation includes hardware primitives specifically configured for packet scheduling operations. A special interlocking mechanism is additionally used to coordinate accesses among multiple processors or threads to the same wide register address locations.

The WRS produces a scheduling engine that is much cheaper than previous hardware solutions with higher performance than previous software solutions. The WRS provides a small, compact, flexible, and scalable scheduling sub-system and can tolerate long memory latencies by using cheaper memory while sharing memory with other uses. The result is a new packet processing architecture that has a wide range of cost/performance points, based on processing requirements.

The foregoing and other objects, features and advantages of the invention will become more readily apparent from the following detailed description of a preferred embodiment of the invention which proceeds with reference to the accompanying drawings.

DETAILED DESCRIPTION

Figure 1:
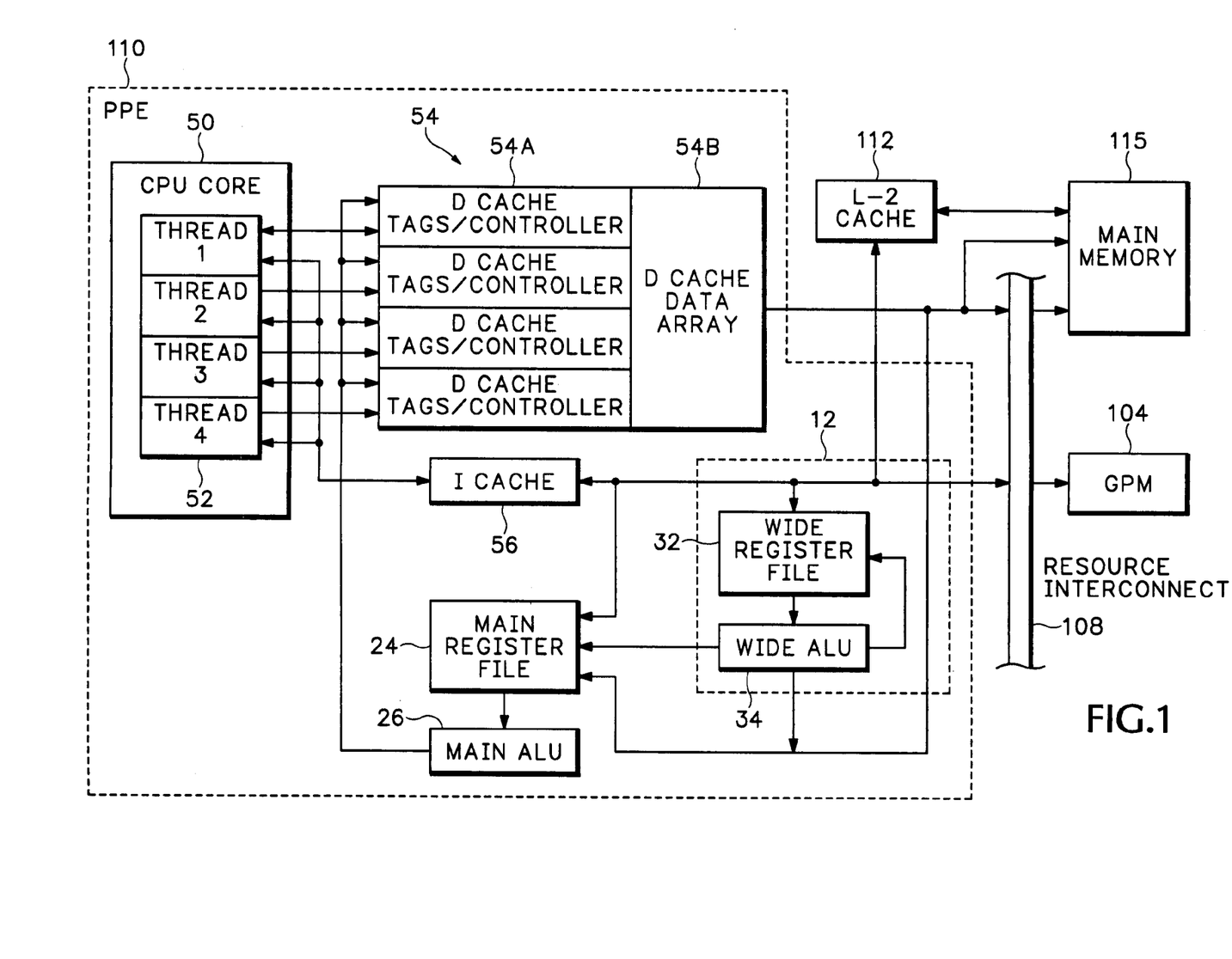
FIG. 1 is a block diagram of a packet processing element that includes a Wide Register Set (WRS).

FIG. 1 shows a block diagram of a Wide Register Set (WRS) 12 used in a multi-threaded Packet Processing Element (PPE) 110. The WRS 12 can be used in any processing device that needs to process both normal width data and some amount of wider width data. The WRS 12 includes a wide register file 32 that includes multiple wide registers that are each wider than registers in a main register file 24.

The main register file 24 is used for most primary operations in the PPE 110 and the wide register file 32 is used for accessing certain data structures and performing particular operations that cannot be efficiently processed in the main register file 24. The WRS 12 also includes a wide Arithmetic Logic Unit (ALU) 34 that conducts wide logic operations on the contents in wide register file 32 that cannot be efficiently performed by the main ALU 26. For example, the wide ALU 34 can perform multiple parallel logic operations on different fields or sub-fields in the wide register file 32.

The registers in wide register file 32 greatly mitigate the cost of accessing main memory 115 by reading large data structures at one time in their natural size. Hardware primitives in the wide ALU 34 can then perform operations on entries in wide register file 32 at a fraction of the processing cost of main ALU 26. These features of the WRS 12 greatly improve the performance of traditional software based packet processing systems.

The PPE 110 includes a Central Processing Unit (CPU) core 50 that operates multiple threads 52. In this embodiment, each thread 52 has associated data cache (DCACHE) 54 that includes tags and cache controllers 54A and share a DCACHE data array 54B. The threads 52 also share a same Instruction Cache (ICACHE) 56. Other cache configurations are also possible where the threads 52 all access the same DCACHE 54 or each thread has an individual ICACHE 56. Both the DCACHE 54 and the ICACHE 56 can access a main memory 115 and a Global Packet Memory (GPM) 104 through a resource interconnect 108.

In one embodiment, the ICACHE 56 may also access the main memory 115 through an L-2 cache 112 and the DCACHE 54 may directly access the main memory 115. Of course other memory configurations are also possible where the DCACHE 54 accesses main memory 115 through the L-2 cache 112 or the ICACHE 56 directly accesses main memory 115.

Figure 2:
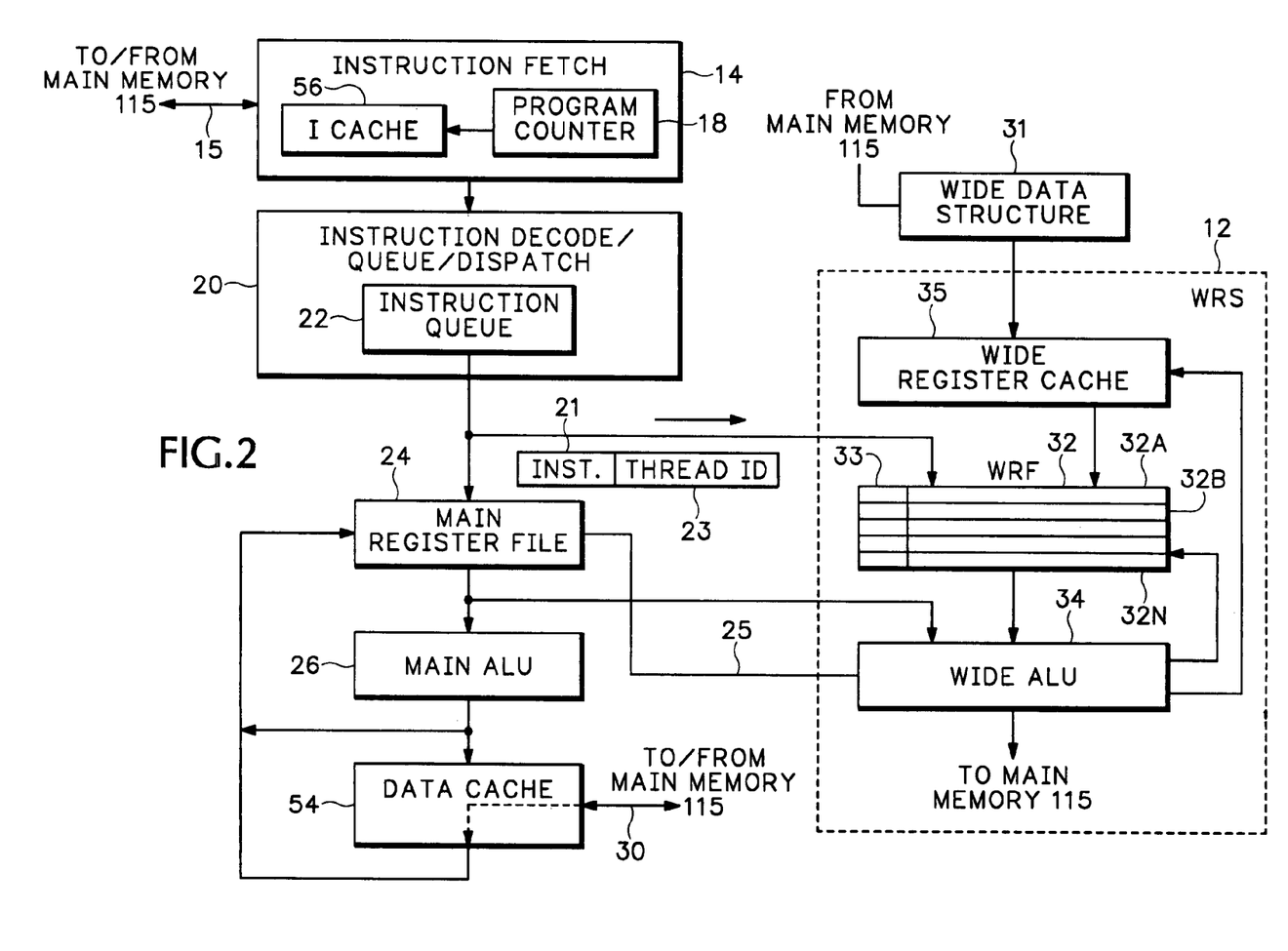
FIG. 2 is a block diagram showing the WRS in more detail.

FIG. 2 shows the WRS 12 in more detail. In one example, the main register file 24 comprises 32×32-bit wide registers and the wide register file 32 comprises 16×512-bit wide registers. However, this is just one example and any number or registers with any variety of bit lengths can be used.

An instruction fetch 14 is initiated by one of the threads 52 (FIG. 1) according to a preferably per-thread program counter 18. Pursuant to the instruction fetch 14, an instruction from ICACHE 56 is decoded, queued and dispatched by the CPU core 50 (FIG. 1) into an instruction queue 22. The decoded instruction 21 and an associated thread identifier 23 are then used to control operations in either the main register file 24 or the wide register file 32.

According to the decoded instruction 21, the main ALU 26 may generate addresses, conduct branch resolutions, etc. for data or instructions in main register file 24. The contents in main register file 24 may be loaded from main memory 115 over line 30 via data cache 54 or may come from the instruction queue 22. Alternatively, the main register may be loaded directly from the main memory 115. The results from main ALU 26 are then either output to the main memory 115 via data cache 54 or sent back to the main register file 24 for further processing.

The decoded instructions 21 sent to the wide WRS 12 are used for controlling logic operations performed on the contents in wide register file 32. The WRS 12 can read an entire wide data structure 31 from main memory 115 into the wide register file 32 at one time. A wide register cache 35 may optionally be provided for caching data from main memory 115 (FIG. 1). The wide ALU 34 processes the contents in wide register file 32 and then sends the results to main memory 115 or back to the wide register file 32 for further processing. The wide ALU 34 includes special hardware primitives that can be used for accelerating particular packet processing operations, such as scheduling.

A data path 25 is provided between the main register file 24 and the wide ALU 34. This allows wide ALU 34 to send results from the wide register operations in WRS 12 to the main register file 24 to complete certain decision making, alignment, masking tasks, etc. that can be efficiently handled by the main ALU 26. The data path 25 also allows contents in the main register file 24 (or parts thereof) to be moved into a portion of the wide register file 32.

Different elements in FIG. 2 may be duplicated for each thread 52 operated by the PPE 110 in FIG. 1. For example, there are one or more wide registers 32A-32N associated with each thread 52. Each wide register 32A-32N has a field 33 that contains a thread identifier for the associated thread 52. There could also be a separate program counter 18, instruction queue 22, data cache 54, and main register file 24 for each thread 52. Other elements, such as the ICACHE 56, main ALU 26, wide ALU 34, and wide register cache 35 might be shared by all the threads 52 operated by the same PPE 110. Of course these are design choices that can be varied for different packet processing applications.

Packet Scheduling

Control structures used for scheduling packets can be very large and complex. For example a min rate, max rate and excess rate may be associated with different packet flows. Each packet may have these and other associated parameters such as time stamps, priority fields, etc. that are used for determining the order for packet processor operations. All of this state information must be updated each time a packet is selected by the scheduling algorithm. If the packet processor uses a hierarchical tree-based scheduling algorithm, this control structure must be updated for each layer in the tree structure after each packet selection. Needless to say, these scheduling operations are processing intensive.

The WRS 12 can be configured to efficiently handle some of these processing intensive scheduling operations. In addition, the wide register file 32 allows different odd-sized fields in the scheduling data structure to be loaded at the same time from main memory 115 into the same wide register file 32. This eliminates having to individually and serially load odd-sized data into the main register file 24 and then pack null values into unused register bits. The wide ALU 34 can then operate on the data structure loaded into wide register file 32 more quickly than the main ALU 26. The wide ALU 34 can operate on these scheduling tasks while other packet processing tasks are performed in parallel using the main ALU 26.

It should also be noted that the PPEs 110 containing WRS 12, or other processor configurations using the WRS 12 for operations such as scheduling, may be distinct from other PPEs 110 used for other primary packet processing. The scheduling PPEs 110, or other scheduling processor configurations using the WRS 12, may have a different structure, a different path to main memory 115, or may use a different main memory than the PPEs 110 used for primary packet processing. The WRS 12 can be used with any of the main packet processors or scheduling processors that require wide register operations.

Hardware Primitives

Figure 3:
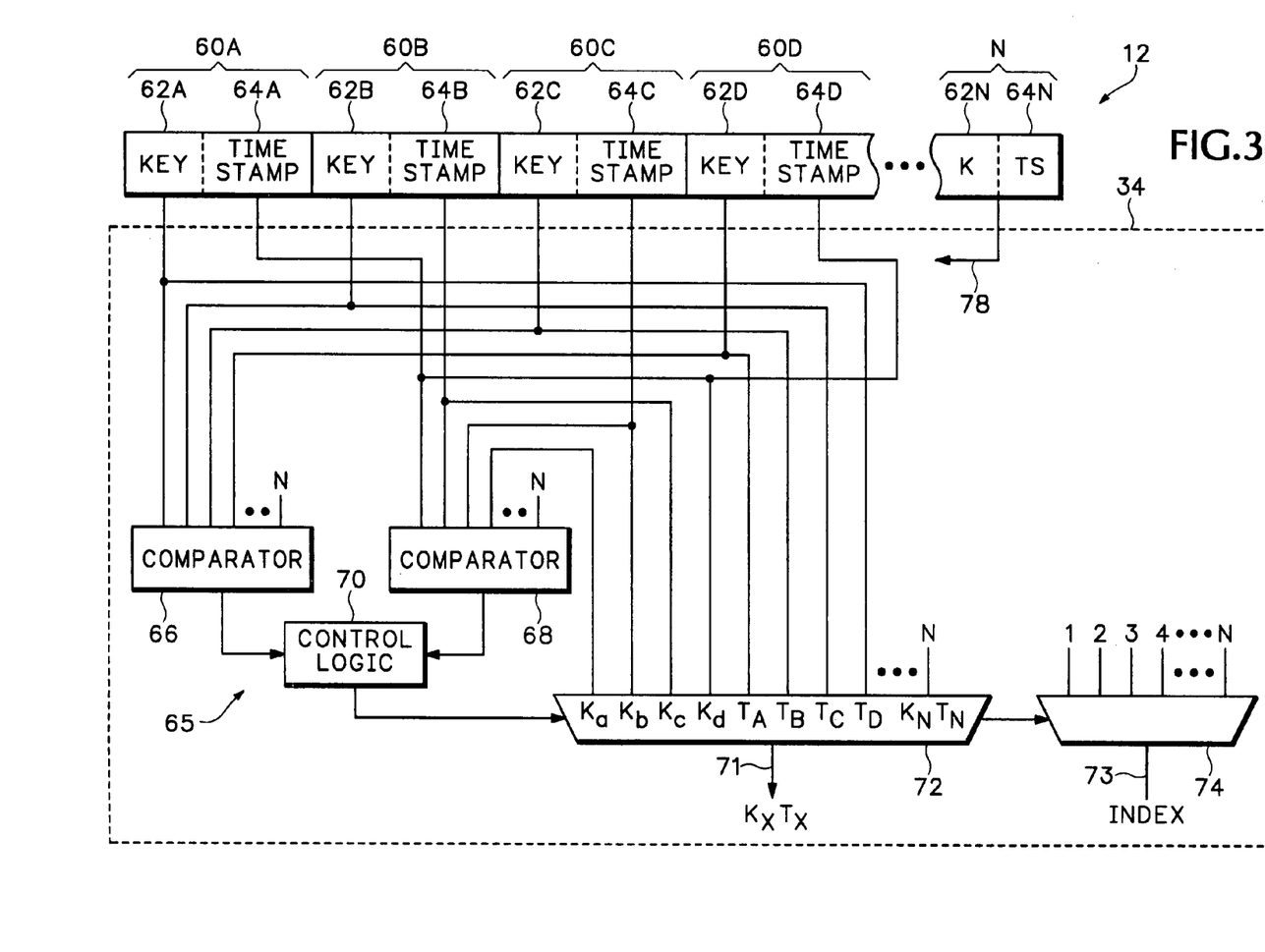
FIG. 3 is a block diagram showing an example of hardware primitives used in a wide register logic unit.
Figure 5:
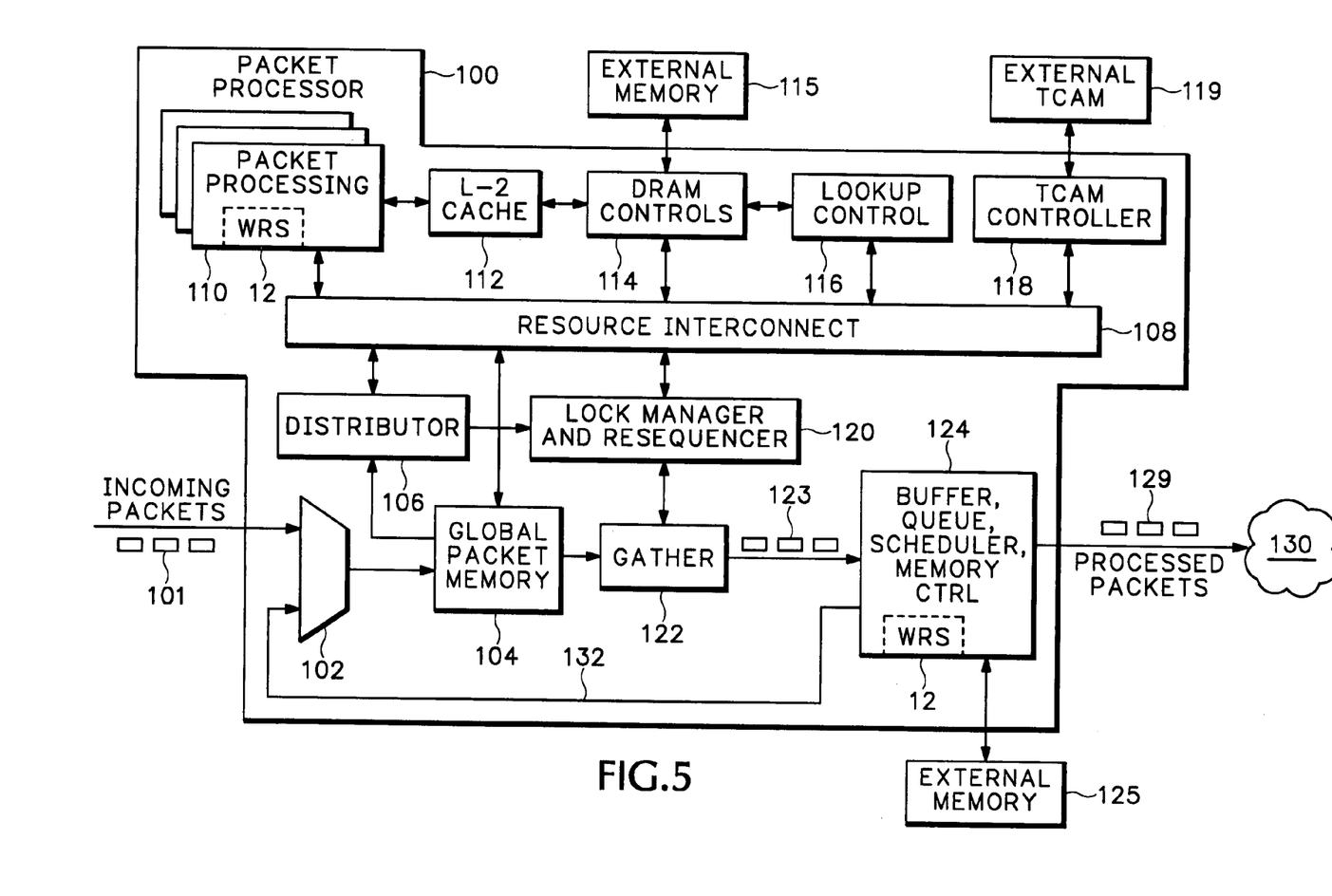
FIG. 5 is a block diagram of a packet processor that uses the WRS.

FIG. 3 shows one example of some of the hardware primitives that can be implemented in the wide ALU 34 to accelerate scheduling operations. The wide register 32A in the wide register file 32 may be loaded with part of a scheduling data structure that has multiple fields 60 that are associated with different types of scheduling data. In this example, each field 60 is associated with a different packet that is stored in a scheduling queue in the packet processor. There can be any number N of fields 60. The values in the fields 60 are used in a scheduling algorithm to determine which packets are processed next by the threads 52 or which packets are scheduled next for transmitting on a network 130 (FIG. 5).

In this example, the fields 60 each include a key/type subfield 62 and a timestamp subfield 64. The values in subfields 62 or 64 may need to be sorted during the scheduling operation to determine a next packet for processing or outputting from the packet processor. The key subfields 62 may identify a type category for the associated packet. For example, the key subfield 62 may identify a high priority packet, low priority packet, or a min rate packet entry for a particular group, etc. The timestamp subfield 64 may be associated with a relative amount of time the packet has been queued in the packet processor.

In this example, the packet with the smallest value in key field 62 may have a higher scheduling priority than packets with larger key values. The packet with the smallest value in timestamp subfield 64 may have higher scheduling status than packets with larger values in timestamp subfield 64. In this example, the combination of the values in timestamp subfield 64 and key subfield 62 are used to determine a next associated packet for scheduling operations.

Logic primitives 65 in the wide ALU 34 include a comparator 66 that identifies the smallest key value in key subfields 62. Another comparator 68 identifies the smallest timestamp value in timestamp subfields 64. Control logic 70 determines a winning key and timestamp combination in one of the fields 60 according to the smallest key value received from comparator 66 and the smallest timestamp value received from comparator 68. The control logic 70 selects the winning key/timestamp pair via a multiplexer 72 that is connected to each key subfield 62 and timestamp subfield 64.

Similarly, the control logic 70 selects an index 73 via multiplexer 74 associated with the selected key and timestamp value 71.

The winning key and timestamp value 71 along with the associated index value 73 may then be sent by wide ALU 34 either back to the wide register file 32 for further updates or to make further scheduling decisions. Note that the results 71 and 73 from the wide ALU 34 can also be sent to the main register file 24 for further processing. This allows particular operations that can be efficiently handled in the main register file 24 by main ALU 26 to be intermixed with the wide register operations performed by WRS 12. This adds further hardware and software flexibility to the scheduling operations.

In one typical operation, the main ALU 26 and main register file 24 are used for addressing memory for both the main register file 24 and for the wide register file 32. This may be more efficient when the main ALU 26 and main register file 24 are optimized memory addressing operations.

The sorting primitives 65 provide the logic functions required for sorting, updating, etc. in the sorting data structure stored in wide register 32A. The large bit length of the wide register 32A allows all of the different fields 60 and subfields 62 and 64 to be more efficiently read from main memory 115 at one time. For example, the values in key subfield 62 may be 5 bits wide and the values in timestamp subfield 64 might be 14 bits wide. All of these different subfields can be loaded into the wide register 32A at the same time and do not require each field to be separately loaded into, for example, a 32 bit wide main register file 24 and then masked and shifted to accommodate either the 5 or 14 bits.

Of course this is only one example and other logic primitives 65 can also be included in the wide ALU 34. For example, the wide ALU 34 can also include a shift operation 78 that can be used to accelerate updates to different fields in the data structure in wide register 32A. Other primitives in the wide ALU 34 can include rate updating primitives that update the timestamp values according to the size and data rate of the associated packets. Other insert and extract primitives can be used to extract data on arbitrary boundaries from the main register file 24 and insert the data into different fields in the wide register file 32. For example, insert and extract primitive commands can include the following:

INSERT MainReg 3=>WideReg 2[17:48];
EXTRACT WideReg 7[13:19]=>MainReg 12.

The Insert command loads the contents of a 32 bit main register 3 into bit locations 17:48 in a wide register 2. The Extract command loads the contents of bit locations 13:19 in wide register 7 into the seven least significant bit locations of main register 12.

As mentioned above, less computationally demanding operations can still be performed by the main ALU 26. This provides the flexibility necessary for varying certain scheduling operations while still having the accelerated processing available in the WRS 12 for brute force primitive operations. The hardware primitives in wide ALU 34 are preferably designed to be generic and do not cast any processing algorithms in stone.

For example, the sorting primitive implemented in the WRS 12 in FIG. 3 might fix the size of the type/key subfield 62 and the timestamp subfield 64 for each entry being sorted, but does not define the meaning of the type/key subfield 62 or the rules governing timestamp updating. Fixing the size of the timestamp subfield 64 only governs rate accuracy, granularity, and range, parameters that are not likely to change much over time. The subfields 62 and 64 can be made large enough to accommodate expected and future uses.

Wide Register Interlocking

It may be necessary to prevent multiple threads from accessing the same wide register data structure at the same time. For example, a packet processor can't have two enqueues (or even an enqueue and a dequeue) both updating the same scheduling entry at the same time. For most things, the time required for the CPU core 50 (FIG. 1) to operate on a data structure is small, and the latency for main memory 115 is large. Thus, it also may be desirable to enable a thread to access the data structure in a wide register 32 that was previously used by another thread without having to wait for the other thread to load the contents back into main memory 115.

The WRS 12 can optionally maintain an interlocking system that keeps track of the addresses in main memory 115 that are currently being used in the wide register file 32 by particular threads. A wide register read to main memory 115 can be "locked" (put in a scoreboard) or unlocked (allow multiple thread readers). If a second thread 52 tries to read a locked address location, the read to main memory 115 is suppressed and is instead added to a link-list table.

When the first thread 52 writes back the main memory address, the data can be sent directly to the wide register 32 associated with the second waiting thread 52. This may stall any thread that attempts to read a wide register memory address that is already in use, but will let the waiting thread get the updated contents of the wide register as soon as the first thread releases the address. This can provide faster latency than waiting for main memory 115 and allows operations for different CPU cores 50 to proceed in parallel and only block as required.

Figure 4:
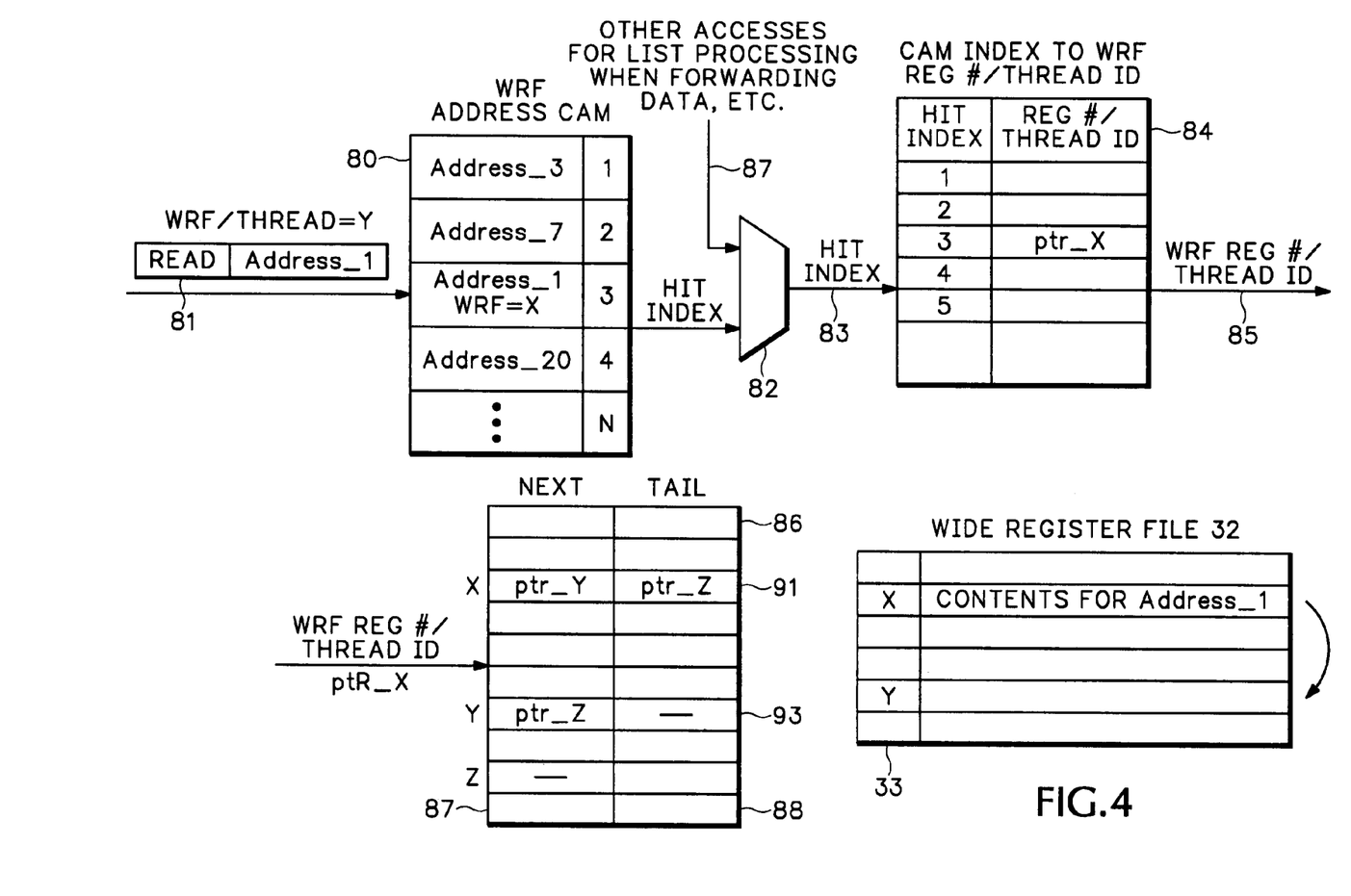
FIG. 4 is a wide register interlocking mechanism.

FIG. 4 shows how an interlocking mechanism can be used in connection with the WRS 12 to further improve processing efficiency. A Wide Register File Content Addressable Memory (WRF CAM) 80 contains addresses for data in main memory 115 (FIG. 1) that are currently being used in the wide register files 32. In one implementation, there is one entry available in CAM 80 for each wide register 32. If for example, there were 16 wide registers per thread, the CAM 80 would have entries for sixteen times the number of threads. Of course, this is just one example and other configurations can also be used.

Each entry in CAM 80 stores the main memory address, if any, owned (locked) by a particular wide register 32. For example, a wide register read operation 81 first accesses CAM 80. If there is no hit in the CAM 80 for the wide register address in read operation 81, the thread 52 associated with read operation 81 returns the data to the wide register 32 associated with that thread. For example, each wide register 32 may have an associated thread identifier 33 (FIG. 2). Contents read from main memory 115 are stored in the wide register file 32 corresponding with the thread 52 initiating read 81.

The thread 52 builds a locking data structure by entering the address for read operation 81 into an unused entry in CAM 80. An index table 84 is then used to map the hit index 83 generated by CAM 80 to an entry in a link-list table 86 associated with the register/thread currently using the address.

To explain in more detail, a first wide register/thread X may currently be accessing a particular address_1 in main memory 115. Another wide register/thread Y may try to access the same address_1 in main memory 115. The first wide register/thread X previously entered address_1 into entry 3 of CAM

80. When register/thread Y tries to read address_1, a match occurs in entry 3 of CAM 80. The CAM 80 outputs a hit index 83 to index table 84.

The output 85 of index table 84 points to an entry 91 in link-list table 86 currently owned by register/thread X. The second wide register/thread Y enters a pointer PTR_Y into a next field 87 for entry 91 in link-list table 86. The pointer PTR_Y points to an entry 93 in link-list table 86 owned by wide register/thread Y. The wide register/thread X after completing processing for address_1, can change index table 84 to have hit index 83 point to entry 93 in link-list table 86 for register/thread Y. This indicates that register/thread Y now "owns" memory address_1. As soon as control of address_1 is released by wide register/thread X, wide register/thread Y is free to copy the contents of the wide register X into wide register Y.

A third wide register/thread Z may try to access the same address_1 while register/thread X still owns address_1. Wide register/thread Z would see the next field 87 for entry 91 in link-list table 86 already occupied by register/thread entry Y. Accordingly, wide register/thread Z enters an associated pointer PTR_Z into the tail field 88 for entry 91 and enters the same pointer PTR_Z into the next field 87 for entry 93. This process repeats for each additional wide register/thread that accesses the same address_1.

Using a second level of index mapping with tables 84 and 86 provides faster pointer updates without having to modify entries in the CAM 80. For example, after wide register/thread X finishes with address_1, the pointer PTR_X in index table 84 for hit index 83 can be changed to point to PTR_Y. The link-list table 86 is now updated changing ownership for address_1 to wide register/thread Y without having to modify the contents of CAM 80. This provides faster interlock updates since accessing CAM 80 is relatively slow.

FIG. 5 shows one example of a multi-threaded packet processor 100 that implements the WRS 12. Packets 101 are received by the packet processor 100 and typically stored in a Global Packet Memory (GPM) 104 via a multiplexer 102. After a packet is received, the GPM 104 builds an associated packet handle data structure and then enqueues the packet on a flow lock queue operated by a lock manager and re-sequencer 120. After receiving a reply back from the lock manager 120, the GPM 104 directs a distributor 106 to allocate the packet 101 to the Packet Processing Elements (PPEs) 110.

The PPEs 110 process the packets in the GPM 104 through a resource interconnect 108. The PPEs 110 may also use a Level-2 (L2) cache 112, Dynamic Random Access Memory (DRAM) controls 114, and lookup control 116 to access external memory 115. An external Ternary Content Addressable Memory (TCAM) 119 is also accessible by the PPEs 110 through the resource interconnect 108 and a TCAM controller 118. In one embodiment, the PPEs 110 are multi-threaded. However, some of the features described below can be performed by any generic processing unit with or without multi-threaded capability.

The PPEs 110 inform the lock manager 120 when they have completed processing a packet. The PPEs 110 are then free to start processing other packets. After being processed by the PPEs 110, the packets continue to reside in the GPM 104 and may be stored in GPM 104 in a scattered non-contiguous fashion. A gather mechanism 122 is responsible for gathering and assembling the scattered portions of the packet back together. The lock manager 120 works with the gather mechanism 122 to determine the final order that the assembled packets 123 are sent from the GPM-104.

In the example above, the PPEs 110 may perform some or all of the buffer, queue, and scheduling operations using WRS 12. However, in an alternative embodiment, a Buffer, Queue, Scheduler (BQS) memory controller 124 queues, schedules, and de-queues packets offloading this time-consuming task from the PPEs 110. In this alternative embodiment, the BQS 124 may have modified PPEs similar to those described above in FIG. 1, however distinct from the packet processing elements 110 used for normal packet processing. In another embodiment, the BQS 124 may simply have one or more CPU cores 50 (FIG. 1) that utilize the WRS 12 as described above.

An external memory 125 is used by the BQS 124 as a packet buffer for, among other things, storing packets between different arrival and main processing operations. A recirculation path 132 is used by the BQS 124 to re-circulate packets back to the GPM 104 for further processing by the PPEs 110. The WRS 12 may alternatively be implemented in the BQS 124.

The general-purpose multi-threaded architecture of the PPEs 110 shown in FIG. 1 includes a main set of general purpose registers as shown in FIG. 2 and a special wide register set 12 grafted on to the side of the main register set. Instructions are provided for moving normal width pieces of data, for example, with a 32-bit length with arbitrary alignment between the wide registers and the general purpose registers. In an alternative embodiment, the BQS 124 may contain one or more CPU cores 50 that utilize the wide register set 12 for conducting certain scheduling tasks.

Instructions for special hardware assisted operations on the wide registers, such as special memory access instructions that load and store the wide registers to/from main memory 115 in wide bit lengths units are provided. Note that an entire wide register does not have to be used. The tracking logic described above in FIG. 4 can be used to indicate which portions of the wide register are "dirty" (modified) and need to be written back to main memory 115.

The wide register set 12 is greatly aided by a memory system offering very wide access to main memory 115, such as 16 Byte or 32 Byte cache lines at a time. Parallel access to memory allow multiple outstanding operations. Optionally, the wide register cache 35 shown in FIG. 2 allows frequently accessed wide register locations to be obtained much more quickly. This would is useful for high-rate schedules as their data would have lower latency, leading to a lower rep rate for processing them.

In terms of die area, the WRS architecture 12 uses a tiny fraction of the die area of the packet processor 100. This is small enough that scheduling sub-systems can be incorporated in many places. Lastly, because cheap/slow "bulk" memory (e.g. DRAM) can be used, there are few limits to the scalability of this architecture. There are just limitations in performance based on the latency of memory and the degree to which parallel schedules can be used.

The WRS 12 can be used for implementing and improving performance of almost any scheduling algorithm including calendars, sorting trees, token buckets, Heirarchical Queuing Framework (HQF), Modular QoS CLI (MQC), priority propagation, etc. The wide registers can implement hardware sorting assists for a hierarchical scheduler, or calendar assists for the more traditional Internet Operating System (IOS) calendar-based approach. Various other hardware assists can be implemented such as rate updates. There are many alternate ways to structure the wide registers themselves, and also the wide register cache 35.

Various other hardware assists, such as the ability to control Direct Memory Access (DMA) read/write of a packet buffer, let the same micro-engine handle the enqueue/dequeue process, as well as the scheduling process. The width of the wide register set 12 and the specifics of the hardware primitives that operate on them can be tailored to specific implementations. The implementation does not have to be multi-threaded, or the multi-threading could be done in a variety of ways.

The system described above can use dedicated processor systems, micro-controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A wide register processing unit, comprising:
    a wide register set including a plurality of wide registers, each having a wider bit length than supported in a main register set, at least one of the wide registers to store data associated with packet scheduling that is loaded from a memory location;
    a wide processing unit configured to perform logic operations on data having a wider bit length stored by one or more of the wide registers in the wide register set, where the wide processing unit is configured to operate independently of a main processing unit used for processing contents in the main register set; and
    an interlocking mechanism to provide a first thread exclusive access to at least one memory location, the first thread to store data from the memory location into the wide register for processing by the wide processing unit, wherein the interlocking mechanism is configured to record in a link-listed table that a second thread is to be provided exclusive access to the at least one memory location upon release by the first thread, when processing by the first thread is complete, the interlocking mechanism is configured to release exclusive access to the at least one memory location from the first thread and provide exclusive access to the second thread according to the link-listed table, the second thread to write the data from the wide register used by the first thread to at least another wide register for subsequent use by the second thread.

2. The processing unit according to claim 1 including an instruction queue selectively sending decoded instructions to the wide register set and the main register set.

3. The processing unit according to claim 1 wherein the wide register set includes separate wide registers having different associated thread identifiers.

4. The processing unit set according to claim 1 wherein an output from the main register set is coupled to both the main processing unit and the wide processing unit and an output of the wide processing unit is coupled to both the main register set and to the wide register set.

5. The processing unit according to claim 4 including a wide register cache coupled between a main memory and the wide register set, where the output of the wide processing unit is coupled to the main register set, to the wide register set, and to the wide register cache.

6. The processing unit according to claim 1 including a central processing core that controls the main register set and the wide register set through multiple different threads.

7. The processing unit according to claim 1 wherein wide registers in the wide register set include multiple fields containing values associated with different associated packets.

8. The processing unit according to claim 7 wherein the multiple fields each contain subfields for storing a packet identifier and a packet timestamp used for conducting packet scheduling operations.

9. The processing unit according to claim 8 wherein the wide processing unit includes logic processing elements that operate in parallel to sort the packet identifier and packet timestamp in the subfields.

10. The processing unit according to claim 1 wherein the interlocking mechanism includes a Content Addressable Memory (CAM) that contains addresses currently being accessed by the threads and the associated wide registers.

11. A method for conducting wide register file operations in a packet processor, comprising:
    sending instructions associated with a first group of main logic operations to a main register set for processing data using a main logic unit; and
    sending instructions associated with a second group of wide bit length logic operations to a wide register set for processing using a wide logic unit, wherein one of the wide registers in the wide register set is configured to store multiple fields corresponding to packets to be scheduled, each field including a packet identifier to identify a type of packet to be scheduled and a packet timestamp corresponding to the packets, in response to the instructions, the second group of wide bit length logic operations to compare packet identifiers from the multiple fields and compare the packet timestamps from the multiple fields to determine a scheduling order for the packets.

12. The method according to claim 11 including sending a thread identifier along with the instructions to identify particular registers in the wide register set.

13. The method according to claim 11 including processing different fields in the wide registers in parallel using the wide logic unit.

14. The method according to claim 11 using a wide register cache to store data accessed by the wide register set or the wide logic unit.

15. The method according to claim 11 including:
    identifying an address currently used by a first thread and first associated wide register;
    locking out all other threads from using the same address;
    processing data corresponding to the address with the first thread;
    recording, in a link-listed table, that a second thread is to be provided exclusive access to the same address upon release by the first thread; and
    allowing the second and other associated wide registers to access the address, after the first thread has completed processing on the contents in the associated first wide register, based on the link-listed table, the second thread to write the data from the wide register used by the first thread to at least another wide register for subsequent use by the second thread.

16. The method according to claim 15 including using the link-list table to identify multiple threads waiting to access the same address and updating the link-list table to point to a next one of the waiting threads after a current thread has completed accessing the same address.

17. The method according to claim 11 including:
operating multiple threads in a packet processing element for processing packets;
conducting scheduling operations that schedule the processing and outputting of the packets;
sending instructions and data associated with the scheduling operations to the wide register set; and
sending results from the wide register set to the main register set for completing the scheduling operations.

18. A network processing device, comprising:
one or more processing elements operating one or more threads that process packets;
a main register set and a main arithmetic unit used by the threads for conducting primary logic operations on the packets;
a wide register set having a wider bit length than the main register set and a wide arithmetic unit used for conducting a second set of operations for data contained in the wide register set; and
an interlocking mechanism controlling access of the different threads to a same address associated with the data in the wide register set by identifying an address currently used by a first thread and a first wide register, locking out all other threads from using the same address, the first thread to store data from the address into a first wide register in the wide register set for processing by the wide arithmetic unit, wherein the interlocking mechanism is configured to record in a link-listed table that a second thread is to be provided exclusive access to the same address upon release by the first thread, when processing by the first thread is complete, the interlocking mechanism is configured to unlock the same address from the first thread and provide exclusive access to the second thread according to the link-listed table, the second thread to write the data from the wide register used by the first thread to at least another wide register for subsequent use by the second thread.

19. The network processing device according to claim 18 including using the wide register set and the wide arithmetic unit for conducting scheduling operations used for determining which packets are processed or transmitted next by the network processing device.

20. A system for conducting wide register file operations in a packet processor, comprising:
means for sending instructions associated with a first group of main logic operations to a main register set for processing data using a main logic unit; and
means for sending instructions associated with a second group of wide bit length logic operations to a wide register set for processing using a wide logic unit, wherein one of the wide registers in the wide register set is configured to store multiple fields corresponding to packets to be scheduled, each field including a packet identifier to identify a type of packet to be scheduled and a packet timestamp corresponding to the packets, in response to the instructions, the second group of wide bit length logic operations to compare packet identifiers from the multiple fields and compare the packet timestamps from the multiple fields to determine a scheduling order for the packets.

21. The system according to claim 20 including:
means for identifying an address currently used by a first thread and first associated wide register;
means for locking out all other threads from using the same address; and
means for processing data corresponding to the address with the first thread;
means for recording, in a linklisted table, that a second thread is to be provided exclusive access to the same address upon release by the first thread; and
means for allowing the second and other associated wide registers to access the address, after the first thread has completed processing on the contents in the associated first wide register, based on the link-listed table, the second thread to write the data from the wide register used by the first thread to at least another wide register for subsequent use by the second thread.

* * * * *

UNITED STATES PATENT AND TRADEMARK OFFICE
CERTIFICATE OF CORRECTION

| | | |
|---|---|---|
| PATENT NO. | : 7,676,646 B2 | Page 1 of 1 |
| APPLICATION NO. | : 11/071660 | |
| DATED | : March 9, 2010 | |
| INVENTOR(S) | : Cohen | |

It is certified that error appears in the above-identified patent and that said Letters Patent is hereby corrected as shown below:

Title Page, Item (57)
Column 2 (Abstract), lines 1-19
DELETE:
"A Wide Register Set (WRS) is used in a packet processor to increase performance for certain packet processing operations. The registers in the WRS have wider bit lengths than the main registers used for primary packet processing operations. A wide logic unit is configured to conduct logic operations on the wide register set and in one implementation includes hardware primitives specifically configured for packet scheduling operations. A special interlocking mechanism is additionally used to coordinate accesses among multiple processors or threads to the same wide register address locations.

The WRS produces a scheduling engine that is much cheaper than previous hardware solutions with higher performance than previous software solutions. The WRS provides a small, compact, flexible, and scalable scheduling sub-system and can tolerate long memory latencies by using cheaper memory while sharing memory with other uses. The result is a new packet processing architecture that has a wide range of cost/performance points, based on desired scheduling requirements."
and INSERT:
-- A Wide Register Set (WRS) is used in a packet processor to increase performance for certain packet processing operations. The registers in the WRS have wider bit lengths than the main registers used for primary packet processing operations. A wide logic unit is configured to conduct logic operations on the wide register set and in one implementation includes hardware primitives specifically configured for packet scheduling operations. A special interlocking mechanism is additionally used to coordinate accesses among multiple processors or threads to the same wide register address locations. The WRS produces a scheduling engine that is much cheaper than previous hardware solutions with higher performance than previous software solutions. The result is a new packet processing architecture that has a wide range of cost/performance points, based on desired scheduling requirements. --, therefor.

Column 12, line 32        In Claim 21, delete "linklisted" and insert -- link-listed --, therefor.

Signed and Sealed this
Thirty-first Day of May, 2011

David J. Kappos
*Director of the United States Patent and Trademark Office*